(12) United States Patent
Xi

(10) Patent No.: US 11,982,912 B2
(45) Date of Patent: May 14, 2024

(54) LIQUID CRYSTAL DISPLAY PANEL AND LIQUID CRYSTAL DISPLAY DEVICE

(71) Applicant: Shenzhen China Star Optoelectronics Semiconductor Display Technology Co., Ltd., Guangdong (CN)

(72) Inventor: Suping Xi, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 851 days.

(21) Appl. No.: 16/969,191

(22) PCT Filed: May 21, 2020

(86) PCT No.: PCT/CN2020/089729
§ 371 (c)(1),
(2) Date: Aug. 12, 2020

(87) PCT Pub. No.: WO2021/203514
PCT Pub. Date: Oct. 14, 2021

(65) Prior Publication Data
US 2023/0161205 A1    May 25, 2023

(30) Foreign Application Priority Data
Apr. 9, 2020  (CN) .......................... 202010274647.9

(51) Int. Cl.
*G02F 1/1362* (2006.01)
*G02F 1/1343* (2006.01)
*G02F 1/1345* (2006.01)

(52) U.S. Cl.
CPC .. *G02F 1/136286* (2013.01); *G02F 1/134318* (2021.01); *G02F 1/13454* (2013.01); *G02F 1/136222* (2021.01)

(58) Field of Classification Search
None
See application file for complete search history.

(56) References Cited

U.S. PATENT DOCUMENTS

| | | | |
|---|---|---|---|
| 8,896,793 B2 * | 11/2014 | Hara | G02F 1/136277 349/149 |
| 2012/0099067 A1 | 4/2012 | Hara et al. | |
| 2014/0292626 A1 | 10/2014 | Park et al. | |
| 2016/0321971 A1 | 11/2016 | Chai | |
| 2017/0148819 A1 * | 5/2017 | Lin | G02F 1/133345 |
| 2018/0188616 A1 | 7/2018 | Jeong et al. | |

FOREIGN PATENT DOCUMENTS

| | | |
|---|---|---|
| CN | 102456333 | 5/2012 |
| CN | 103761935 | 4/2014 |
| CN | 105974686 | 9/2016 |
| CN | 106773203 | 5/2017 |
| CN | 108121119 | 6/2018 |
| CN | 108803173 | 11/2018 |
| CN | 110596967 | 12/2019 |

* cited by examiner

*Primary Examiner* — Richard H Kim

(57) ABSTRACT

A liquid crystal display (LCD) panel and an LCD device are provided. The LCD panel includes a display area, a gate driver on array (GOA) circuit area, and a first common electrode line disposed therebetween. A plurality of virtual pixels are disposed on a side of the display area near the GOA circuit area and are arranged along a column direction. Each of the virtual pixels includes a virtual pixel electrode, and the first common electrode line is connected to each of the virtual pixel electrodes.

16 Claims, 2 Drawing Sheets

LIQUID CRYSTAL DISPLAY PANEL AND LIQUID CRYSTAL DISPLAY DEVICE

RELATED APPLICATIONS

This application is a National Phase of PCT Patent Application No. PCT/CN2020/089729 having International filing date of May 12, 2020, which claims the benefit of priority of Chinese Patent Application No. 202010274647.9 filed on Apr. 9, 2020. The contents of the above applications are all incorporated by reference as if fully set forth herein in their entirety.

FIELD AND BACKGROUND OF THE INVENTION

The present disclosure relates to the field of display technologies, and more specifically, relates to a liquid crystal display (LCD) panel and an LCD device.

Gate driver on array (GOA), which has a row scan driving signal circuit manufactured on an array substrate by a conventional process of manufacturing thin film transistor (TFT) arrays, realizes a driving method of line-by-line scanning.

Conventional LCD panels are provided with a common electrode line which is expected to be as stable as possible, and a typical method is to thicken the common electrode line. However, space in the LCD panels is limited, which means that the common electrode line cannot be thick enough, thus affecting stability of the LCD panels.

SUMMARY OF THE INVENTION

An objective of an embodiment of the present disclosure is to provide an LCD panel and an LCD device to solve following problem: space in conventional LCD panels is limited, so that a common electrode line cannot be thick enough, which affects stability of the LCD panels.

An embodiment of the present disclosure provides an LCD panel, including a display area, a gate driver on array (GOA) circuit area, and a first common electrode line disposed between the display area and the GOA circuit area.

A plurality of virtual pixels are disposed on a side of the display area near the GOA circuit area and are arranged along a column direction, each of the virtual pixels includes a virtual pixel electrode, and the first common electrode line is connected to each of the virtual pixel electrodes.

In the LCD panel according to the present disclosure, the virtual pixel electrodes are block-shaped.

In the LCD panel according to the present disclosure, the virtual pixel electrodes are square block-shaped or circular block-shaped.

In the LCD panel according to the present disclosure, the first common electrode line and the virtual pixel electrodes are disposed on different layers.

In the LCD panel according to the present disclosure, a plurality of first through-hole groups are defined on the LCD panel, the first through-hole groups have a one-to-one correspondence relationship with the virtual pixels, and the first common electrode line is connected to the virtual pixel electrodes by the first through-hole groups.

In the LCD panel according to the present disclosure, the first common electrode line extends along the column direction.

In the LCD panel according to the present disclosure, a plurality of second common electrode lines are disposed on the display area and are arranged along the column direction, the first common electrode line is connected to the second common electrode lines, and the first common electrode line and the second common electrode lines are disposed on different layers.

In the LCD panel according to the present disclosure, the second common electrode lines extend along a row direction.

In the LCD panel according to the present disclosure, a plurality of scan lines are disposed on the display area and are arranged along the column direction, the scan lines and the second common electrode lines are disposed on a same layer, and a GOA circuit is disposed on the GOA circuit area.

A plurality of third through-hole groups are defined on the LCD panel and have a one-to-one correspondence relationship with the scan lines, and the GOA circuit and the scan lines are connected to each other by the third through-hole groups.

An embodiment of the present disclosure further provides an LCD device, including a backlight module and an LCD panel disposed on the backlight module, the LCD panel includes a display area, a gate driver on array (GOA) circuit area, and a first common electrode line disposed between the display area and the GOA circuit area.

A plurality of virtual pixels are disposed on a side of the display area near the GOA circuit area and are arranged along a column direction, each of the virtual pixels includes a virtual pixel electrode, and the first common electrode line is connected to each of the virtual pixel electrodes.

In the LCD device according to the present disclosure, the virtual pixel electrodes are block-shaped.

In the LCD device according to the present disclosure, the virtual pixel electrodes are square block-shaped or circular block-shaped.

In the LCD device according to the present disclosure, the first common electrode line and the virtual pixel electrodes are disposed on different layers.

In the LCD device according to the present disclosure, a plurality of first through-hole groups are defined on the LCD panel, the first through-hole groups have a one-to-one correspondence relationship with the virtual pixels, and the first common electrode line is connected to the virtual pixel electrodes by the first through-hole groups.

In the LCD device according to the present disclosure, the first common electrode line extends along the column direction.

In the LCD device according to the present disclosure, a plurality of second common electrode lines are disposed on the display area and are arranged along the column direction, the first common electrode line is connected to the second common electrode lines, and the first common electrode line and the second common electrode lines are disposed on different layers.

In the LCD device according to the present disclosure, the second common electrode lines extend along a row direction.

In the LCD device according to the present disclosure, a plurality of scan lines are disposed on the display area and are arranged along the column direction, the scan lines and the second common electrode lines are disposed on a same layer, and a GOA circuit is disposed on the GOA circuit area.

A plurality of third through-hole groups are defined on the LCD panel and have a one-to-one correspondence relationship with the scan lines, and the GOA circuit and the scan lines are connected to each other by the third through-hole groups.

Regarding the beneficial effects: in an LCD panel and an LCD device provided by embodiments of the present disclosure, a first common electrode line disposed between a display area and a GOA circuit area is connected to a plurality of virtual pixel electrodes. A capacitor generated on the virtual pixel electrodes and on electrodes on a color filter substrate is connected to a capacitor generated on the first common electrode line and on the electrodes on the color filter substrate in parallel, which increases a capacitance of the capacitor generated on the first common electrode line and on the electrodes on the color filter substrate, thereby improving stability of the LCD panel.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DESCRIPTION OF SPECIFIC EMBODIMENTS OF THE INVENTION

Hereinafter a preferred embodiment of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

Figure 1:
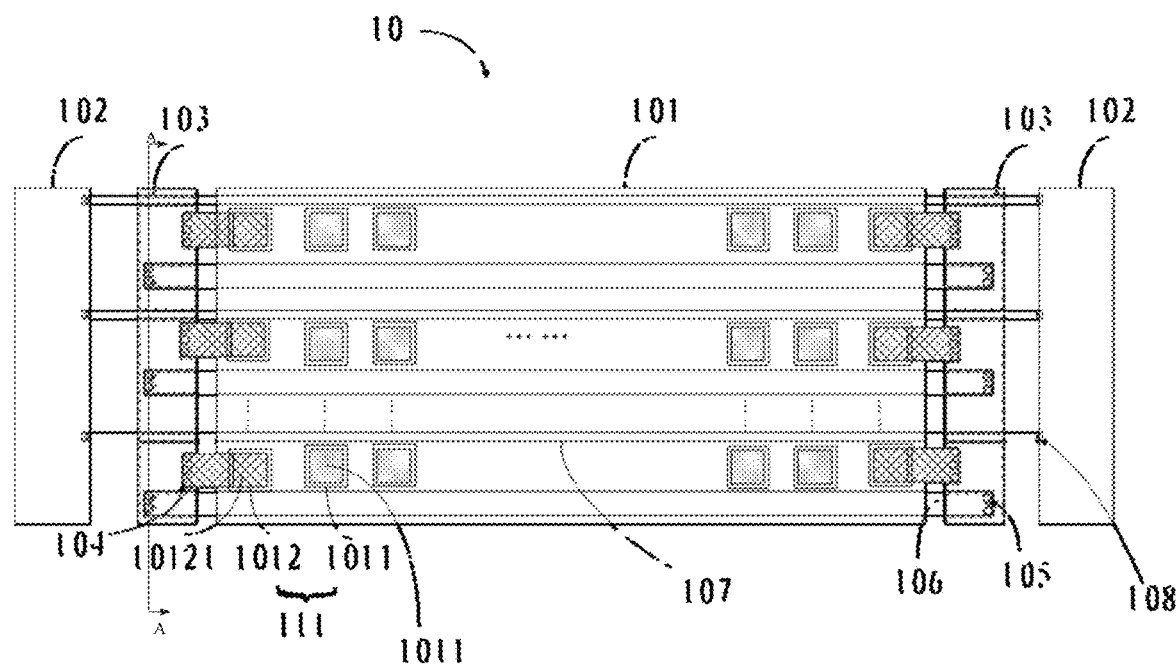
FIG. 1 is a schematic structural view showing an LCD panel provided by an embodiment of the present disclosure.

Please refer to FIG. 1, a schematic structural view showing an LCD panel provided by an embodiment of the present disclosure is shown. An LCD panel 10 provided by the present embodiment includes a display area 101, a plurality of gate driver on array (GOA) circuit areas 102, and a plurality of first common electrode lines 103 disposed between the display area 101 and the GOA circuit areas 102. It should be understood that the GOA circuit areas 102 and the first common electrode lines 103 are disposed at two opposite sides of the display area 101.

A plurality of pixels 111 are disposed on the display area 101 in an array manner. The pixels 111 include a plurality of display pixels 1011 and a plurality of virtual pixels 1012. The virtual pixels 1012 are disposed on a side of the display area 101 near the GOA circuit areas 102, and are arranged along a column direction. In the present embodiment, it should be understood that there are two columns of the virtual pixels 1012 which are respectively disposed on two opposite sides of the display area 101. The display pixels 1011 are disposed between the two columns of the virtual pixels 1012 in an array manner and are used to display. The virtual pixels 1012 are merely configured to realize etching uniformity.

Please continue to refer to FIG. 1, the first common electrode lines 103 are connected to a plurality of virtual pixel electrodes 10121. A capacitor generated on the virtual pixel electrodes 10121 and on electrodes on a color filter substrate is connected to a capacitor generated on the first common electrode lines 103 and on the electrodes on the color filter substrate in parallel, which increases a capacitance of the capacitor generated on the first common electrode lines 103 and on the electrodes on the color filter substrate, thereby improving stability of the LCD panel 10.

Figure 2:
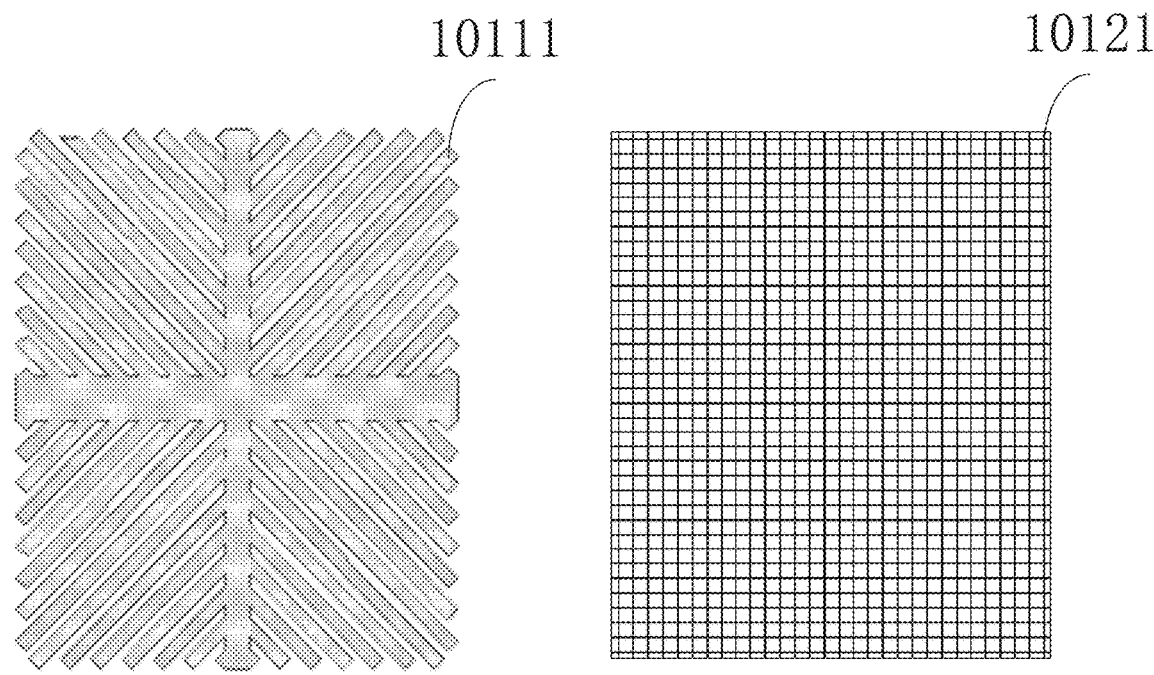
FIG. 2 is schematic structural views comparing a display pixel with a virtual pixel.

Furthermore, please refer to FIG. 2, schematic structural views showing a display pixel and a pixel electrode in FIG. 1 are provided. A display pixel 1011 includes a plurality of display pixel electrodes 10111 which are designed to be pozidriv-shaped. Each of the display pixel electrodes 10111 has a strip-shaped vertical trunk, a strip-shaped horizontal trunk, and two strip-shaped branches having predetermined angles with respect to the horizontal trunk and the vertical trunk. Generally, an angle between the strip-shaped branches and the horizontal trunk is ±45 degrees or ±135 degrees. Each of the strip-shaped branches, the vertical trunk, and the horizontal trunk are positioned on a same plane. The vertical trunk and the horizontal trunk centrally crisscross each other, which means that they are perpendicular to each other, and an area where they crisscross is a center of the display pixel electrode 10111. The display pixel electrode 10111 is equally divided into four regions by the vertical trunk and the horizontal trunk, and each of the four regions is formed from the flattened strip-shaped branches having the predetermined angles with respect to the vertical trunk or the horizontal trunk. In other words, the display pixel electrodes are designed to be strip-shaped. A virtual pixel 1012 includes a plurality of virtual pixel electrodes 10121 which are designed to be block-shaped. It should be noted that other structures of the display pixel 1011 and those of the virtual pixel 1012 are same, which are not described here. For example, a TFT structure of the display pixel 1011 and that of the virtual pixel 1012 are same.

In the present embodiment, the virtual pixel electrodes 10121 are designed to be block-shaped and are connected to the first common electrode lines 103 by multiple through-holes. The virtual pixel electrodes 10121 may be rectangular block-shaped, square block-shaped, or circular block-shaped, thereby enlarging a direct facing area of the virtual pixel electrodes 10121 and a direct facing area of the electrodes on the color filter substrate. Therefore, the capacitance of the capacitor generated on the first common electrode lines 103 and on the electrodes on the color filter substrate is further increased.

Figure 3:
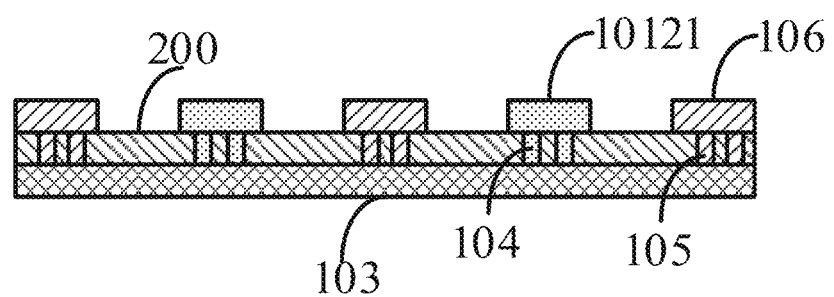
FIG. 3 is a perspective structural view showing the LCD panel taken along line AA in FIG. 1.

Please refer to FIG. 3, the first common electrode lines 103 and the virtual pixel electrodes 10121 are positioned on different layers. A plurality of first through-hole groups 104 are defined on the LCD panel 10 and have a one-to-one correspondence with the virtual pixels 1012, and the first common electrode lines 103 are connected to the virtual pixel electrodes 10121 by the first through-hole groups 104, wherein each of the first through-hole groups 104 includes a plurality of first through-holes. In the present embodiment, by defining the first through-holes, the first common electrode lines 103 and the virtual pixel electrodes 1012 can be ensured to be sufficiently connected to each other.

Furthermore, a plurality of second common electrode lines 106 are further disposed on the display area 101 and are arranged along the column direction. The first common electrode lines 103 and the second common electrode lines 106 are connected to each other and are positioned on different layers.

Correspondingly, a plurality of second through-hole groups 105 are further defined on the LCD panel 10 and have a one-to-one correspondence relationship with the second common electrode lines 106. The first common electrode lines 103 are connected to the second common electrode lines 106 by the second through-hole areas 105. Each of the second through-hole areas 105 includes a plurality of second through-holes. In the present embodiment, by defining the second through-holes, the first common electrode lines 103 and the second common electrode lines 106 can be ensured to be sufficiently connected to each other.

A plurality of scan lines 107 are further disposed on the display area 101 and are arranged along the column direction. The scan lines 107 and the second common electrode lines 106 are positioned on a same layer. A GOA circuit is disposed on the GOA circuit area 102 and is connected to the scan lines 107.

Correspondingly, a plurality of third through-hole groups 108 are further defined on the LCD panel and have a one-to-one correspondence relationship with the scan lines 107. The GOA circuit is connected to the scan lines 107 by the third through-hole areas 108. Each of the third through-hole groups 108 includes a plurality of third through-holes. In the present embodiment, by defining the third through-holes, the GOA circuit and the scan lines 107 can be ensured to be sufficiently connected to each other.

In the LCD panel provided by the present embodiment, each of the first common electrode lines 103 extends along the column direction, and each of the second common electrode lines 106 extends along the row direction.

In the LCD panel provided by the embodiment of the present disclosure, the first common electrode line disposed between the display area and the GOA circuit area is connected to the virtual pixel electrodes. The capacitor generated on the virtual pixel electrodes and on the electrodes on the color filter substrate is connected to the capacitor generated on the first common electrode line and on the electrodes on the color filter substrate in parallel, which increases the capacitance of the capacitor generated on the first common electrode line and on the electrodes on the color filter substrate, thereby improving stability of the LCD panel.

The present embodiment further provides an LCD device, including a backlight module and an LCD panel disposed thereon, wherein the LCD panel has been mentioned in above embodiment, and is not described here again.

The above descriptions are only embodiments which do not limit the patent scope of the present disclosure. Equivalent structure or equivalent process transformations based on the description of the present disclosure and the contents of the drawings, for example, the combination of technical features between the embodiments, or directly or indirectly applied in other related technical fields, are included within the scope of patent protection of the present disclosure.

The invention claimed is:

1. A liquid crystal display (LCD) panel, comprising a display area, a gate driver on array (GOA) circuit area, and a first common electrode line disposed between the display area and the GOA circuit area;
   wherein a plurality of virtual pixels are disposed on a side of the display area near the GOA circuit area and are arranged along a column direction, each of the virtual pixels comprises a virtual pixel electrode, and the first common electrode line is connected to each of the virtual pixel electrodes,
   wherein a plurality of display pixels used to display are disposed on the display area, and each of the display pixels comprises a display pixel electrode,
   wherein the display pixel electrode has a strip-shaped vertical trunk, a strip-shaped horizontal trunk, and two strip-shaped branches having predetermined angles with respect to the horizontal trunk and the vertical trunk, and the virtual pixel electrodes are block-shaped.

2. The LCD panel of claim 1, wherein the virtual pixel electrodes are square block-shaped or circular block-shaped.

3. The LCD panel of claim 1, wherein the first common electrode line and the virtual pixel electrodes are disposed on different layers.

4. The LCD panel of claim 3, wherein a plurality of first through-hole groups are defined on the LCD panel, the first through-hole groups have a one-to-one correspondence relationship with the virtual pixels, and the first common electrode line is connected to the virtual pixel electrodes by the first through-hole groups.

5. The LCD panel of claim 1, wherein the first common electrode line extends along the column direction.

6. The LCD panel of claim 1, wherein a plurality of second common electrode lines are disposed on the display area and are arranged along the column direction, the first common electrode line is connected to the second common electrode lines, and the first common electrode line and the second common electrode lines are disposed on different layers.

7. The LCD panel of claim 6, wherein the second common electrode lines extend along a row direction.

8. The LCD panel of claim 1, wherein a plurality of scan lines are disposed on the display area and are arranged along the column direction, the scan lines and a plurality of second common electrode lines are disposed on a same layer, and a GOA circuit is disposed on the GOA circuit area; and
   wherein a plurality of third through-hole groups are defined on the LCD panel and have a one-to-one correspondence relationship with the scan lines, and the COA GOA circuit and the scan lines are connected to each other by the third through-hole groups.

9. A liquid crystal display (LCD) device, comprising a backlight module and an LCD panel disposed on the backlight module, the LCD panel comprises a display area, a gate driver on array (GOA) circuit area, and a first common electrode line disposed between the display area and the GOA circuit area;
   wherein a plurality of virtual pixels are disposed on a side of the display area near the GOA circuit area and are arranged along a column direction, each of the virtual pixels comprises a virtual pixel electrode, and the first common electrode line is connected to each of the virtual pixel electrodes,
   wherein a plurality of display pixels used to display are disposed on the display area, and each of the display pixels comprises a display pixel electrode,
   wherein the display pixel electrode has a strip-shaped vertical trunk, a strip-shaped horizontal trunk, and two strip-shaped branches having predetermined angles with respect to the horizontal trunk and the vertical trunk, and the virtual pixel electrodes are block-shaped.

10. The LCD device of claim 9, wherein the virtual pixel electrodes are square block-shaped or circular block-shaped.

11. The LCD device of claim 9, wherein the first common electrode line and the virtual pixel electrodes are disposed on different layers.

12. The LCD device of claim 11, wherein a plurality of first through-hole groups are defined on the LCD panel, the first through-hole groups have a one-to-one correspondence relationship with the virtual pixels, and the first common electrode line is connected to the virtual pixel electrodes by the first through-hole groups.

13. The LCD device of claim 9, wherein the first common electrode line extends along the column direction.

14. The LCD device of claim 9, wherein a plurality of second common electrode lines are disposed on the display area and are arranged along the column direction, the first common electrode line is connected to the second common electrode lines, and the first common electrode line and the second common electrode lines are disposed on different layers.

15. The LCD device of claim 14, wherein the second common electrode lines extend along a row direction.

16. The LCD device of claim 9, wherein a plurality of scan lines are disposed on the display area and are arranged along the column direction, the scan lines and a plurality of second common electrode lines are disposed on a same layer, and a GOA circuit is disposed on the GOA circuit area; and wherein a plurality of third through-hole groups are defined on the LCD panel and have a one-to-one correspondence relationship with the scan lines, and the COA GOA circuit and the scan lines are connected to each other by the third through-hole groups.

* * * * *